UNITED STATES PATENT OFFICE.

BERTRAND B. GRUNWALD, OF REDWOOD CITY, CALIFORNIA, ASSIGNOR TO NATIONAL MAGNESIA MANUFACTURING COMPANY, A CORPORATION OF CALIFORNIA.

MATERIAL FOR CLOSING OFF WATER IN OIL-WELLS.

1,318,076. Specification of Letters Patent. Patented Oct. 7, 1919.

No Drawing. Application filed June 18, 1917. Serial No. 175,398.

*To all whom it may concern:*

Be it known that I, BERTRAND B. GRUNWALD, a subject of the Emperor of Austria, and a resident of Redwood City, San Mateo county, State of California, have invented a certain new and useful Material for Closing Off Water in Oil-Wells, of which the following is a specification.

The invention relates to a material for closing off water in an oil well.

An object of the invention is to provide a rapidly setting material for closing off water in an oil well.

Heretofore, when water has been encountered in drilling an oil well, the water has been closed off with Portland cement. In order to flow the cement into the space between the side of the well and the casing to close off the water, the cement must be mixed with sufficient water to make it very thin. This thin cement mixture requires several weeks before it sets and attains its total strength and during that time it is frequently displaced or cracked by the pressure of the water and the operation is unsuccessful. Conditions are frequently met with in oil wells where it has been impossible to close off the water with Portland cement and the further drilling of the well has to be abandoned.

In accordance with my process I employ a magnesia cement formed of magnesium oxid or calcined magnesite and magnesium chlorid. The magnesium chlorid is first dissolved in water and the solution is mixed with the calcined magnesite to form a thin paste or a thin mixture which is immediately introduced into the well. This mixture sets very rapidly and attains its full strength in a few hours and has been successfully employed by me in closing off water in oil wells, where the use of Portland cement has failed.

I have found that the addition of "magnesium sand" to the above mixture greatly improves its properties for the present purpose, and I have added as high as 50% of "magnesium sand" to the mixture. This "magnesium sand" is the residue of the manufacture of magnesium carbonate from magnesite and consists of dead burned magnesite and crude magnesite in very finely divided form. The addition of this "magnesium sand" makes the cement more water resistant and heat resistant and increases its strength.

I have found that by heating the various ingredients of the mixture prior to or at the time of mixing and pouring the mixture into the well while hot that the time required for setting is greatly reduced, so that the cement will set almost immediately after it has been placed in the well. The time of setting may be further accelerated by adding quick lime, "calcium chlorid" or other calcium salt to the mixture and the addition of these salts will accelerate the setting whether the mixture is heated or not. I have added as much as ten per cent. of "calcium chlorid" to the mixture.

I claim:

1. A material for sealing off water in an oil well consisting of a mixture of a magnesium cement, dead burned and crude finely divided magnesite and a calcium salt.

2. A material for sealing off water in an oil well consisting of a mixture of magnesium cement, dead burned and crude finely divided magnesite, calcium chlorid and water.

In testimony whereof, I have hereunto set my hand at Redwood City, California, this 26th day of May, 1917.

BERTRAND B. GRUNWALD.